United States Patent [19]

Fletcher

[11] Patent Number: 4,467,066

[45] Date of Patent: Aug. 21, 1984

[54] PRODUCTION OF IGNITION-RETARDANT POLYMERS

[75] Inventor: Robert A. Fletcher, Houston, Tex.

[73] Assignee: Shell Oil Company, Houston, Tex.

[21] Appl. No.: 452,592

[22] Filed: Dec. 23, 1982

[51] Int. Cl.³ ............................ C08L 53/02; C08J 3/22
[52] U.S. Cl. ..................................... 524/371; 524/505;
524/411; 525/89; 525/901; 525/71
[58] Field of Search .................. 525/89, 901; 524/371, 524/505

[56] References Cited

U.S. PATENT DOCUMENTS

| | | | |
|---|---|---|---|
| 4,000,114 | 12/1976 | Gordon et al. | 260/45.95 |
| 4,039,629 | 8/1977 | Himes et al. | 525/89 |
| 4,117,035 | 9/1978 | Lawrence et al. | 525/89 |
| 4,267,283 | 5/1981 | Whitehead | 525/89 |

OTHER PUBLICATIONS

Feniak to CIC/SPE Meeting, Mississauga, Ontario, Nov. 5, 1981.

Primary Examiner—Carman J. Seccuro
Attorney, Agent, or Firm—Jennifer R. Daunis

[57] ABSTRACT

The impact strength of ignition retardant styrenic polymers is improved by incorporating a thermoplastic elastomeric radial block copolymer and a non-thermoplastic polydiene elastomer during the polymerization of the styrenic monomer.

12 Claims, No Drawings

PRODUCTION OF IGNITION-RETARDANT POLYMERS

BACKGROUND OF THE INVENTION

1. Field of the Invention

The present invention relates to a process for the production of ignition retardant polymers, and in particular to a process whereby thermoplastic elastomer is incorporated during polymerization to mitigate the effect on impact strength of adding ignition retardant additives.

2. Description of the Prior Art

Polymers derived from styrene have been commercially applied for many years, including the "high impact" modifications in which the impact strength is improved by incorporating a minor amount of an elastomer during the polymerization. See, for example, U.S. Pat. Nos. 2,694,692 and 3,485,894. The replacement of conventional elastomers by radial block copolymers leads to a breakdown of the structural morphology, as disclosed in a paper presented by Feniak to CIC/SPE Meeting, Mississauga, Ontario, on Nov. 5, 1981. It is also known to improve the flame resistance of polystyrene, including its high impact modifications, by blending with flame retardant additives, such as brominated diphenyl ether and antimony oxide, see, e.g., U.S. Pat. No. 4,000,114. Since the incorporation of such flame retardants into the polymer may lower its impact strength, a further amount of rubber is often blended with the ignition retardant polymer to compensate for that loss for impact strength.

An existing procedure for producing such ignition retardant products is through physical blending of the rubber-modified high impact polystyrene with the appropriate quantities of ignition retardant additives and further rubber. However, such a procedure inevitably involves significant blending and handling costs, and considerable improvements in operational efficiency, and hence savings in costs, would be obtained if the ignition retardant additives and the supplemental rubber could be added directly into the polymer in the course of its production. The brominated nature of most ignition retardants creates practical difficulties to their presence during the polymerization process, but the incorporation at that stage of at least part of the supplemental rubber would confer useful benefits.

SUMMARY OF THE INVENTION

The present invention provides a process for preparing an ignition retardant, impact improved poly(vinyl aromatic) composition, which comprises:

(a) thermally polymerizing a solution of a thermoplastic elastomeric radial block copolymer and a non-thermoplastic polydiene elastomer dissolved in a monomer feed in which the sole polymerizable monomer component consists essentially of one or more mono(-vinyl aromatic) compounds, the weight proportions of elastomers to monomer being about 2 to about 25 parts elastomer (combined) in, respectively, about 98 to about 75 parts monomer, and the proportions of the non-thermoplastic to thermoplastic elastomers being from, respectively, about 5:1 to about 1:1, at a temperature in the range of from about 90° C. to about 200° C., with agitation until the reaction mixture has undergone phase inversion, for a time sufficient to polymerize substantially all of the mono(vinyl aromatic) compound;

(b) removing any residual monomers, to yield an interpolymer containing discrete gelled rubber particles;

(c) blending the resultant interpolymer with:
  (i) ignition retardant additives; and
  (ii) a thermoplastic, elastomeric block copolymer, the amounts being selected so that the final composition contains from about 1 to about 50% by weight of the composition of ignition retardant additives and from about 1 to about 12% by weight of the composition of thermoplastic elastomeric block copolymer.

The properties of rubber-modified polystyrene are critically dependent on the prepolymerization conditions and it is known that the addition of thermoplastic rubbers at this sensitive stage of a styrene/butadiene interpolymerization will seriously impair the morphology of the dispersed phase. Thus, for example, Echte discloses in Die Angewandte Chemie 58/59, No. 846 (1977) p. 175, and 90 (1980) p. 95 that graft and block elastomeric copolymers act as a surfactant in orienting across the interface between the matrix and the rubbery dispersed phase, resulting in a marked reduction in particle size and gel content. Similarly, Feniak (op. cit.) discloses that the substitution of progressively larger amounts of thermoplastic elastomeric block copolymer in place of the non-thermoplastic diene elastomer leads to a sharp decrease in rubber particle size and a structural breakdown. Against this established technical background it would therefore be expected that the addition of significant proportions of thermoplastic rubbers to the prepolymerizer would adversely affect the morphology of the final product. The present invention derives from the surprising, and unexpected, discovery that, quite contrary to the general teachings of the prior art, these thermoplastic elastomeric copolymers having a radial block structure may be introduced in significant amounts at the prepolymerization stage without adverse effect, thereby facilitating the operational procedures required to produce an ignition retardant material.

DETAILED DESCRIPTION OF THE INVENTION

As explained above, a critical feature of this invention is the use of a radial block copolymer as the thermoplastic rubber added to the prepolymerizer. This radial block copolymer is suitably a polymer having the general structure $(AB)_xBA$, where x is greater than 1, each block A being a monoalkenyl arene polymer having an average molecular weight between about 5,000 and 45,000, each block B being an elastomeric conjugated diene polymer having an average molecular weight between about 15,000 and about 300,000, and said blocks A comprise 8–75% by weight of each copolymer. Preferably, x varies from over 1 to 15, more preferably from about 2 to about 6. A typical radial polymer would be one in which the diene block is derived from butadiene and has three or more branches, the tip of each branch being connected to a polystyrene block. See, e.g., U.S. Pat. No. 3,594,452. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have number average molecular weights between about 8,000 and about 30,000. The elastomeric conjugated diene polymer blocks preferably have number average molecular weights between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 75%, preferably between about 20% and about 50% by weight. The general type and preparation of these block copolymers are described in U.S. Pat. No. Re. 28,246 and in many other U.S. and foreign patents.

The non-thermoplastic polydiene elastomer dissolved in the monomer feed may be any of such elastomeric materials well known for impact improvement of polystyrene. Thus, it may be derived from dienes such as butadiene or isoprene, which may be copolymerized with styrene to form vulcanizable, elastomeric copolymers such as styrene-butadiene. This polydiene elastomer component is preferably polybutadiene.

The amounts of the different elastomers used in step (a) are preferably such that the solution undergoing reaction contains from about 5 to about 10% by weight of the non-thermoplastic polydiene elastomer, and up to about 5%, preferably from about 2 to about 3%, by weight of the thermoplastic radial block copolymer.

The mono(vinyl aromatic) compounds which can be used as monomers in the process of this invention include monovinyl-aromatic compounds having the vinyl radical attached directly to a carbon atom of the aromatic nucleus, such as styrene and mixtures thereof with minor amounts (e.g., 5–35 percent by weight) of alpha-methylstyrene. Examples of other monovinyl-aromatic compounds applicable in preparing the compositions according to the invention are alkyl and halogen derivatives of styrene such as ortho, meta and para-methylstyrenes, para, meta and ortho ethylstyrenes, para-isopropylstyrene, ortho, para and meta-dichlorostyrenes, ar-dimethyl styrenes, para-bromostyrene, para-fluorostyrene, alpha-methylstyrene, 1,3-methoxy styrene, para-tertiary butylstyrene, ar-dimethyl-alphamethyl styrene, 3,4-dichloromethyl styrene and mixtures of these compounds with each other, or with styrene. Preferred monomers are styrene and para-methylstyrene (which may contain small amounts of other isomeric methylstyrenes).

The actual reaction conditions used in step (a) are well known in the art for the preparation of high impact polystyrene. Thus, the polymerization is generally carried out in the absence of a catalyst, though it may sometimes be desirable to add a catalyst of the free radical generating type. Suitable polymerization catalysts of this type are peroxides such as benzoyl peroxide, di-tert-butyl-peroxide, t-butyl peroxypivalate, diethyl peroxy-carbonate, t-butyl peracetate and others well known in the art which are generally added in concentrations from about 0.01 to 0.2% by weight of the polymerized monomers. Coloring agents which are inert to the polymerization may also be added. The mixture is then subjected to conditions which will cause the styrenic monomers to polymerize with the rubber in a bulk process. Good results are obtained by heating the solution to a temperature of from about 90° C. to about 200° C. for a time sufficient to polymerize substantially all of the styrenic compounds. The heating may be done with the addition of catalysts; the use of catalysts allows somewhat lower polymerization temperatures. Generally speaking, bulk polymerization for high impact compositions requires agitation for temperature control of the first polymerization stage and for proper dispersal of the rubbery material as it undergoes phase inversion, i.e., precipitates from the solution during this early polymerization step.

After the polymerization is complete the product may contain a small amount, e.g., about 1 to 2%, of unpolymerized styrenic monomer. As the presence of monomer has an adverse affect on impact properties, this is preferably removed by any of the known methods for removing residual monomer. Such methods include, e.g., subjecting the interpolymer to vacuum, e.g., in a devolatilizing extruder.

Antioxidants, chain regulators, lubricants, and fillers inert to the reaction can also be added. Examples of suitable antioxidants include 2,6-di-tert-butyl-4-methylphenol and trisnonylphenylphosphite, which may be added in amounts from about 0.1% to about 2% by weight of the total reaction mixture and preferably in amounts from about 0.25 to about 1%. Light stabilizers such as 2-alkyl-2,3,4-benzotriazole may also be incorporated into the polymerization mass. Suitable chain transfer agents include sulfhydryl compounds, e.g., dodecyl-mercaptan and 2-mercaptoethanol. Preferred are alkyl mercaptans having from about 8 to 20 carbon atoms per molecule or mixtures of these which can be added to the reaction mixture in amounts from about 0.0005 up to about 1% weight of the total composition. The preferred concentration of mercaptan is from about 0.015 to about 0.05 weight percent. The polymerization may be carried out in the presence of small amounts of other compounds which are known to be useful in preparing molding compositions. This includes low concentrations of lubricants or flow agents such as mineral oil of a viscosity in the range of about 100 to 500 SSU, paraffin wax, petrolatum, polybutenes and the like in concentrations up to about 10% by weight of the total mixture, preferably in amounts of about 1 to about 5 weight percent, for improving both the processing and molding characteristics of the polymer product.

The ignition retardant additives utilizable in the process of this invention can be any of the well known flame retardants for thermoplastic polymers, including but not limited to chlorowax, haloorganophosphorous compounds, and inorganic fluoborates. The flame retardant can be a single material or a mixture of several materials. One type of flame retardant is the addition product of phosphorus, carboxylic, or sulfonic acids with a bicyclic phosphite disclosed in U.S. Pat. Nos. 3,789,091 and 3,849,368, which are incorporated herein by reference. Typical utilizable mixtures are disclosed in U.S. Pat. No. 3,635,866, which is incorporated herein by reference. Other utilizable phosphonate mixtures are disclosed in U.S. Pat. No. 4,144,387, which is incorporated herein by reference. Preferred materials are a mixture of a brominated diphenyl ether, suitably decabromodiphenyl ether, and antimony oxide. The amounts of flame retardant in the final composition can vary dependent upon the nature of the material used. Generally, they will be 1 to 50 percent, preferably 5 to 25 percent, based upon the weight of the total composition.

The thermoplastic elastomeric block copolymer incorporated in step (c) may be a linear ABA type block copolymer or a radial (AB)$_x$BA block copolymer where x is greater than 1, each block A being a monoalkenyl arene polymer having an average molecular weight between about 5,000 and 45,000; each block B being an elastomeric conjugated diene polymer having an average molecular weight between about 15,000 and about 300,000, and said blocks A comprise 8–75% by weight of the copolymer. Preferably this thermoplastic elastomer is a radial block copolymer of the type described above in relation to step (a), a conveniently it is the same type of material as that incorporated in step (a). The exact amount of thermoplastic block copolymer added in step (c) will, of course, depend on the amount already introduced in step (a); preferably the amount is such that the total amount of thermoplastic block copolymer in the final composition is from about 4 to about 5% by weight of the total composition.

The blending of the interpolymer with the ignition retardant additives and block copolymer (step (c)) may be effected by any of the established procedures, including conventional batch blending of the relevant components. However, such batch blending inevitably involves significant handling costs which can be significantly reduced by adding a masterbatch directly into the polymer in the course of its production. "Masterbatch" is a term well-known in the art to describe (in the context of the polymer operations) a pre-formed mixture used to incorporate additives into a polymer, and which contains polymer together with the additives in a higher concentration than is required in the final product. This masterbatch concentrate is then metered into the mainstream polymer product at a rate set to give the desired concentration of additives in the final product. In the present context, the masterbatch would contain both the ignition retardant additives and the additional thermoplastic elastomeric block copolymer of step (c).

Applicants have found that some of the difficulties which can arise with a rubber-containing masterbatch can be minimized by the introduction of part of the rubber into the prepolymerizer according to the process of this invention. Because the components of a masterbatch are diluted by blending with the mainstream polymer, the presence of a relatively small amount of thermoplastic rubber (TR) in the mainstream polymer can permit a very significant reduction in the TR content required in the masterbatch. Accordingly, a preferred embodiment of the process is that wherein, in stage (c) the extruded interpolymer is blended with a masterbatch containing:

(i) ignition retardant additives;
(ii) a thermoplastic, elastomeric block copolymer; and
(iii) homopolymer of the mono(vinyl aromatic) compound used in stage (a);

the amounts of the masterbatch components and the proportions of interpolymer and masterbatch being selected so that the final composition contains from about 1 to about 50% by weight of the composition of ignition retardant additives and from about 1 to about 12% by weight of the composition of thermoplastic elastomeric block copolymers.

The masterbatch can be blended with the interpolymer according to any of the established procedures, one convenient procedure being to blend the masterbatch continuously with the interpolymer during its passage through the extruder or immediately downstream thereof, suitably by injection through a side-arm extruder. The exact amount of copolymer incorporated in the masterbatch will, of course, depend on the amount already introduced in step (a) and also the proportions in which the masterbatch and interpolymer will be mixed (the let-down ratio). Preferably, the let-down ratio is from about 3:1 to about 4:1, and the amount of block copolymer in the masterbatch is such that the total block copolymer in the final composition is from about 4 to about 5% by weight of the total composition.

The invention is further illustrated by reference to the following Examples, which are given for the purpose of illustration only and are not meant to limit the invention to the particular reactants and conditions described therein.

EXAMPLE 1

7.5 parts by weight of a medium cis-content polybutadiene homopolymer (designated Diene ®55) was dissolved in 92.5 parts by weight of styrene, together with selected amounts of a radial styrene/butadiene block copolymer (designated Kraton ®1184) or (for comparative purposes) a styrene/butadiene/styrene linear triblock copolymer (designated Kraton ®1101), and batch polymerization effected with agitation at a temperature of about 125° C. until about 30% of the styrene was converted to polymer. This prepolymerizate was then transferred to a glass jar and converted to high impact polystyrene by heating on a sand bath.

The results of these tests are set out in Tables 1 and 2 below. From Table 1 it is apparent that conventional amounts of radial TR rubber do not cause a significant change in particle size. From Table 2 it is apparent that the linear triblock K-1101 caused a reduction in gel content, while with the radial block copolymer K-1184 the gel content actually increased.

TABLE 1

| Sample | K-1184% | Relative Particle Size ($\mu$) |
|---|---|---|
| 1 | 0 | 1.13 |
| 2 | 2 | 1.10 |
| 3 | 3 | 1.10 |
| 4 | 5 | 1.03 |

TABLE 2

| Sample | TR Added | Gel Content (% Corrected to Swell Index of 12) |
|---|---|---|
| 5 | — | 28.4 |
| 6 | K-1101 2% | 26.4 |
| 7 | K-1101 4% | 26.5 |
| 8 | K-1184 2% | 26.6 |
| 9 | K-1184 3% | 29.7 |
| 10 | K-1184 4% | 29.0 |
| 11 | K-1184 5% | 33.5 |

EXAMPLE 2

Masterbatch compositions were formulated to contain varying amounts of ignition retardant additives and of the radial copolymer K-1184. In all cases the blend from the Banbury mixer was free from crosslinking. These formulations were then extruded through a 3.8 cm. Brabender at 75 rpm and melt temperature 225°–232° C. to establish their stability under conditions corresponding to those normally encountered with in-line blending operations. The details of the formulations and the results of their evaluations are set out in Table 3 below, from which it is apparent that all the formulations can be satisfactorily extruded.

TABLE 3

| Masterbatch Number | 1 | 2 | 3 | 4 |
|---|---|---|---|---|
| DBDPO | 47.20 | 56.05 | 56.05 | 59.0 |
| $Sb_2O_3$ (70% Conc. in PS) | 18.40 | 21.85 | 21.85 | 23.0 |
| Zinc Stearate | 0.4 | 0.48 | 0.48 | 0.5 |
| K-1184 Crumb | 12.05 | 10.13 | — | 6.74 |
| K-4158 Crumb[1] | — | — | 15.12 | 6.07 |
| DP3035 | 21.95 | 11.49 | 6.5 | 4.69 |
| Surface of Extrudate | Smooth | Smooth | Rough | Slightly Roughened |
| Effect of Toluene on Extrudate | Disperses Completely | Disperses Completely | Some Swelling/ Clumping | Disperses Completely |
| Implications | Free from crosslinking | Free from crosslinking | Significant crosslinking Brittle extrudate[2]. | Almost free from crosslinking. Extrudate too brittle[2] to permit stranding. |

Notes:
MB 1: equivalent to a 3:1 letdown with 2% reactor addition.
MB 2: equivalent to a 3.75:1 letdown with 3% reactor addition.
MB 3: equivalent to a 3.75:1 letdown with 3% reactor addition and 2% oil addition.
MB 4: equivalent to a 4:1 letdown with a 3% reactor additon and 2% oil addition.
[1]K-4158 is composed 66% K-1184 and 33% mineral oil.
[2]Due largely to the very high solids content.

What is claimed is:

1. A process for preparing an ignition retardant, impact improved poly(vinyl aromatic) composition, which comprises:
   (a) thermally polymerizing a solution of a thermoplastic elastomeric radial block copolymer of a monoalkenyl arene polymer and an elastomeric conjugated diene polymer and a non-thermoplastic polydiene elastomer dissolved in a monomer feed in which the sole polymerizable monomer component consists essentially of one or more mono(vinyl aromatic compounds, the weight proportions of elastomers to monomer being about 2 to about 25 parts elastomer (combined) in, respectively, about 98 to about 75 parts monomer, and the proportions of the non-thermoplastic to thermoplastic elastomers being from, respectively, about 5:1 to about 1:1, at a temperature in the range of from about 90° C. to about 200° C., with agitation until the reaction mixture has undergone phase inversion, for a time sufficient to polymerize substantially all of the mono(vinyl aromatic) compound;
   (b) removing any residual monomers, to yield an interpolymer containing discrete gelled rubber particles;
   (c) blending the resultant interpolymer with:
      (i) ignition retardant additives; and
      (ii) a thermoplastic, elastomeric block copolymer of a monoalkenyl arene polymer and an elastomeric conjugated diene polymer, the amounts being selected so that the final composition contains from about 1 to about 50% by weight of the composition of ignition retardant additives and from about 1 to about 12% by weight of the composition of thermoplastic elastomeric block copolymer with part of the thermoplastic elastomeric block copolymer in the final composition being added in (a) and part being added in (c).

2. The process as claimed in claim 1 wherein the thermoplastic radial block copolymer present in step (a) has the structure $(AB)_xBA$ where x is greater than 1, each block A being a monoalkenyl arene polymer having an average molecular weight between about 5,000 and 45,000, each block B being an elastomeric conjugated diene polymer having an average molecular weight between about 15,000 and about 300,000, and said blocks A comprise 8–75% by weight of each copolymer.

3. The process as claimed in claim 2, wherein, in the radial block copolymer, block A is polystyrene and block B polybutadiene blocks.

4. The process as claimed in claim 2 wherein the solution polymerized in step (a) contains from about 5 to about 10% by weight of the non-thermoplastic polydiene elastomer and up to about 5% by weight of the thermoplastic radial block copolymer.

5. The process as claimed in claim 4 wherein the amount of radial block copolymer is from about 2 to about 3% by weight.

6. The process as claimed in claim 1 wherein the thermoplastic elastomeric block copolymer of step (c) is a radial block as defined in claim 2.

7. The process as claimed in claim 2 wherein the non-thermoplastic polydiene elastomer is polybutadiene.

8. The process as claimed in claim 2 wherein the mono(vinyl aromatic) compound is styrene.

9. The process as claimed in claim 2 wherein the ignition retardant additives comprise a mixture of brominated diphenyl ether and antimony oxide.

10. The process as claimed in claim 1 wherein, in step (c), the extruded interpolymer is blended with a masterbatch containing:
    (i) ignition retardant additives;
    (ii) a thermoplastic, elastomeric block copolymer; and
    (iii) homopolymer of the mono(vinyl aromatic) compound used in stage (a); the amounts of the masterbatch components and the proportions of interpolymer and masterbatch being selected so that the final composition contains from about 1 to about 50% by weight of the composition of ignition retardant additives and from about 1 to about 12% by weight of the composition of thermoplastic elastomeric copolymers.

11. The process as claimed in claim 10 wherein the amounts of masterbatch components and the proportions of interpolymer and masterbatch are selected so that the final composition contains from about 5 to about 25% by weight of the composition of ignition retardant additives and from about 4 to about 5% by weight of the composition of the thermoplastic, elastomeric block copolymer.

12. The process as claimed in claim 11 wherein the weight ratio of interpolymer to masterbatch in step (c) is from about 3:1 to about 4:1.

* * * * *